United States Patent [19]

Eisenstein et al.

[11] 4,399,091

[45] Aug. 16, 1983

[54] COMFORT ADDITIVE FOR ACRYLIC FIBERS

[75] Inventors: Stephen E. Eisenstein, Oak Park; Edward M. Dexheimer, Grosse Ile, both of Mich.

[73] Assignee: BASF Wyandotte Corporation, Wyandotte, Mich.

[21] Appl. No.: 360,456

[22] Filed: Mar. 22, 1982

[51] Int. Cl.$^3$ .................. D01D 5/08; D01F 6/18
[52] U.S. Cl. .................. 264/182; 264/178 F; 264/206; 525/127
[58] Field of Search .............. 525/727; 264/206, 182, 264/178 F

[56] References Cited

U.S. PATENT DOCUMENTS

| | | | |
|---|---|---|---|
| 3,474,061 | 10/1969 | von Bonin et al. | 524/819 |
| 4,264,645 | 4/1981 | von Bonin et al. | 428/290 |
| 4,283,500 | 8/1981 | Armstrong et al. | 525/127 |
| 4,332,765 | 6/1982 | Reinehr et al. | 264/206 |

Primary Examiner—J. Ziegler
Attorney, Agent, or Firm—Bernhard R. Swick

[57] ABSTRACT

A process for improving the comfort of garments made from acrylonitrile polymer filaments by incorporating in the filaments, a polymer obtained by cross-linking a polyether with an isocyanate.

20 Claims, No Drawings

COMFORT ADDITIVE FOR ACRYLIC FIBERS

BACKGROUND OF THE INVENTION

1. Field of the Invention

This invention relates to the production of filaments and fibers from filament-forming acrylonitrile polymers characterized by improved comfort.

2. Description of the Prior Art

Acrylonitrile fibers and fabrics prepared therefrom possess many desirable attributes. However, their lack of "comfort" has severely limited penetration of the cotton and wool markets. "Comfort" as defined herein refers to the ability of a fiber to transfer body moisture from the inside of a garment made therefrom to the outside where it can evaporate. Because of the large market potential there is a great interest in methods for increasing the "comfort" of acrylonitrile fabrics. The best method of increasing "comfort" is to incorporate a suitable additive into the acrylic solution before spinning. Common additives include anionic and cationic as well as nonionic surfactants, such as polyether polyols. While these surfactants increase the comfort of acrylonitrile polymer fabrics, they dissolve out of the fiber during the quench step of the solvent spinning process and during laundering. Loss of the surfactant into the quench bath is particularly serious because it makes recycling of the bath difficult and presents a waste disposal problem. Loss of the surfactant during laundering obviously decreases the value of the product to the consumer.

The following patents are pertinent to the instant invention:

U.S. Pat. No. 4,239,722—relates to a process for production of filaments and fibers from filament-forming synthetic polymers by spinning a solution which, in addition to a suitable solvent, contains from 5 to 50 percent by weight of a substance which is essentially a non-solvent for the polymer. The preferred filament-forming synthetic polymers are acrylonitrile polymers and the non-solvent additives include, in a list thereof, ethers and esters of polyhydric alcohols. There is no disclosure of the use of polyols cross-linked with polyisocyanates and the materials are deliberately selected so that they can be washed out of the filaments with a washing liquid.

U.S. Pat. No. 3,474,061—relates to a method for preparation of a stable system suitable for treating textiles wherein a cross-linkable polymer which contains certain listed groups, which list includes urethane, imide, amide, hydroxy, carboxy groups, etc., is mixed with a cross-linker prepared by reacting an alkoxymethyl isocyanate with a compound having at least 2 active hydrogen atoms. The cross-linked material apparently is applied only as coatings on textiles and does not incorporate the isocyanate cross-linked additive or any other additive into the fiber solution before spinning.

U.S. Pat. No. 4,264,645—relates to a treating agent which may be a polyether with a molecular weight of between 500 and 8500, and an ethylene oxide content of about 35 to 80 weight percent and cross-linkable end groups. These may be cross-linked with an isocyanate prepolymer or polyether isocyanate with commercially available mixtures of TDI preferred. This material is not incorporated into an acrylic solution before spinning but rather is applied to a substrate, particularly fleece-based artificial leathers, from an aqueous solution.

U.S. Pat. No. 3,329,557—relates to dispersing a high molecular weight poly(alkylene ether) in a melt-spinnable synthetic polymer which is then melt spun and drawn to provide a textile filament. There is no disclosure of cross-linking the polyalkylene ether and the purpose is to increase antistatic properties.

British Pat. No. 1,151,942—relates to a process for the production of polyester filaments and fibers wherein a water-soluble polyester is added to the polyester to be spun before the spinning process. The water-soluble polyester is subsequently washed out after the spinning process. There is no suggestion of cross-linking of any kind and particularly no disclosure of cross-linking with an isocyanate.

SUMMARY OF THE INVENTION

Relates to improved comfort of fabrics produced from acrylonitrile filaments obtained by spinning a solution comprising a solvent and a filament forming acrylonitrile polymer. A polyether polyol is cross-linked with a polyisocyanate to form a high viscosity liquid which is then incorporated in the acrylonitrile solution before spinning.

DETAILED DESCRIPTION OF THE INVENTION

The production of filaments by spinning a solution comprising a solvent and a filament forming acrylonitrile polymer is well known to those skilled in the art as evidenced by, for example, U.S. Pat. No. 4,239,722, and, accordingly, detailed descriptions of such processes is not needed here.

In accordance with the instant invention, it has been found that polymers obtained by cross-linking a polyether with an isocyanate improve the "comfort" of polyacrylonitrile fibers. As previously stated, "comfort" as defined herein refers to the ability of a fiber to transfer body moisture from the inside of a garment to the outside where it can evaporate. These cross-linked materials have surprisingly been found to be greatly superior to non-cross-linked polyethers because of the extremely slow rate at which they dissolve in water and organic solvents, but at the same time forming clear, gel-free solutions with low surface tension. This slow rate of dissolution prevents loss of the additive from the fiber during fiber spinning and subsequent laundering.

The present invention, therefore, relates to filaments of an acrylonitrile polymer containing as an additive the polymer obtained by cross-linking a polyether with an isocyanate.

The compounds included in the group of acrylonitrile polymers are, particularly, polyacrylonitrile or copolymers of acrylonitrile with (meth)-acrylic acid esters, e.g., methyl and ethyl esters of acrylic and methacrylic acid; with (meth)-acrylamides, e.g. (meth)-acrylamide and N,N-dimethyl-(meth)-acrylamide; with N-vinyl lactams, e.g. N-vinyl pyrrolidone; with vinyl esters or ethers and (meth)-allyl esters or ethers; with vinyl or vinylidene halides, e.g. vinyl or vinylidene chloride and bromide; with alkyl vinyl pyridine, e.g. N-vinyl-4-methyl pyridine; with vinyl imidazoles; with (mono)-dialkylaminoalkyl acrylates and methacrylates, e.g. dimethylaminoethyl (meth)-acrylate and their quaternised derivatives; with vinyl and (meth)-allyl sulphonic acids; and with vinyl and (meth)-allyl phosphonic acids or their esters. All of these copolymers should contain at least 60%, by weight, of acrylonitrile in a copolymerised form.

The acrylonitrile filament according to the present invention may be obtained by adding to the acrylonitrile solution from about 0.5 to 10.0 percent and preferably 3.0 to 7.0 percent by weight, based on the overall mixture, of a polymer obtained by cross-linking a polyether with an isocyanate. The solvent is then removed in a process which is accompanied by shaping. These filaments include threads, fibers and foils. The solvent employed may be any conventional solvent employed for spinning acrylonitrile polymers into filaments. Preferred solvents include dimethylformamide, dimethylacetamide, dimethylsulfoxide and N-methylpyrollidinone. The amount of solvent in the overall mixture ranges from about 10.0 to 50.0 percent and preferably 20.0 to 30.0 percent by weight.

The polyether polyol which may be cross-linked with the polyisocyanate will generally have a molecular weight of from about 1,000 to 14,000. Suitable compounds include polyoxyalkylene-polyether polyols such as the polymerization product of an alkylene oxide or of an alkylene oxide with a polyhydric alcohol. Any suitable polyhydric alcohol may be employed including both aliphatic and aromatic such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, 2-butene-1,4-diol, glycerol, 1,1,1-trimethylolpropane, 1,1,1-trimethylolethane, hexane-1,2,6-triol, α-ethylglucoside, pentaerythritol and sorbitol. Also included with the term polyhydric alcohol are compounds derived from phenolic compounds such as 2,2-bis(4-hydroxy-phenyl)propane, commonly known as Bisphenol A, and hydroxyalkyl ethers of such phenolic compounds such as bis-2-hydroxyethylether of hydroxyquinone.

Any suitable alkylene oxide may be used such as ethylene oxide, propylene oxide, butylene oxide, amylene oxide, and heteric or block copolymers of these oxides. However, this polyol must contain at least 20 percent by weight polyoxyethylene groups. The polyoxyalkylene polyether polyol may be prepared from other starting materials such as tetrahydrofuran and alkylene oxide-tetrahydrofuran copolymers; epihalohydrins such as epichlorohydrin; as well as aralkylene oxides such as styrene oxide. The polyoxyalkylene polyether polyol may have either primary or secondary hydroxyl groups and preferably are polyethers prepared from alkylene oxides having from 2 to 6 carbon atoms such as polyethylene ether glycols, polypropylene ether glycols, and polybutylene ether glycol. However, the resulting product, as pointed out above, must contain at least 20 percent by weight polyoxyethylene groups. The polyoxyalkylene polyether polyols may be prepared by any known process such as, for example, the process disclosed by Wertz in *Encyclopedia of Chemical Technology*, Vol. 7, pages 257 to 262, published by Interscience Publishers, Inc. (1951), or in U.S. Pat. No. 1,922,459. Alkylene oxide adducts of Mannich condensation products are also useful in the invention. The above polyether polyols have a molecular weight from about 1,000 to 14,000 and contain from about 20 to 100 percent by weight of the oxyethylene groups.

Among the polyoxyalkylene polyether polyols which can be used are those which correspond to the formula:

$$Y[(C_3H_6O)_n(C_2H_4O)_mH]_x$$

wherein Y is the residue of an organic compound having from about 1 to 6 carbon atoms and containing x reactive hydrogen atoms in which x has a value of at least one, n and m have a value such that the oxyethylene content of the molecule is from about 20 to 100 weight percent and the total molecular weight is from about 1,000 to 14,000. Compositions of this type are more particularly described in U.S. Pat. Nos. 2,674,619 and 2,677,700.

Other suitable polyether polyols correspond to the formula:

$$Y[(C_2H_4O)_m(C_3H_6O)_nH]_x$$

wherein Y, n, m and x have values as set forth above. Compositions of this type are more particularly described in U.S. Pat. No. 3,036,118.

In either of the above formulas, compounds falling within the scope of the definition for Y include, for example, propylene glycol, ethylene glycol, dipropylene glycol, diethylene glycol, glycerine, pentaerythritol, trimethylolpropane, ethylene diamine and the like. Also, the oxypropylene chains optionally, but advantageously, contain small amounts of ethylene oxide and the oxyethylene chains also optionally, but adventageously, contain small amounts of propylene oxide.

In preparing the cross-linked product of the subject invention, any suitable organic polyisocyanate or mixture thereof can be employed. Representative organic polyisocyanates correspond to the following formula:

$$R(NCO)_z$$

wherein R is a polyvalent organic radical which is either aliphatic, aralkyl, aromatic or mixtures thereof, and z is an integer which corresponds to the valence of R and is at least 2. Representatives of the organic polyisocyanates contemplated herein include, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4′4″-triphenylmethane triisocyanate, 2,4,6-toluene triisocyanates; the aromatic tetraisocyanates such as 4,4′-dimethyldiphenylmethane-2,2′-5,5′-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4′-biphenylene diisocyanate, 3,3′-dimethoxy-4,4′-biphenyl diisocyanate, 3,3′-dimethyl-4,4′-biphenyl diisocyanate, and 3,3′-dimethyldiphenylmethane-4,4′-diisocyanate. These polyisocyanates are prepared by conventional methods known in the art such as the phosgenation of the corresponding organic amine. Included within the useable isocyanates are the modification of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in

*Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The isocyanate and polyol are reacted in an NCO/OH ratio of from about 1:10 to 10:1 and preferably from about 1:5 to 2:1. The cross-linked products in accordance with the present invention may be added to the spinning solution of the acrylonitrile polymer either as the high viscosity liquid product of the cross-linking reaction or as a solution in the solvent such as the solvents set forth above, particularly dimethylformamide, in quantities of from about 10 to 60 percent by weight, preferably from about 30 to 50 percent by weight based on the polymer mixture.

For a more complete understanding of the present invention, reference is made to the following examples. In the examples, all parts are by weight and all temperatures are in degrees centigrade in the absence of indications to the contrary.

EXAMPLE 1

An 1100 gram sample of an ethoxylated synthetic fatty amine is heated to 55° C. in a 3 liter flask provided with mechanical stirrer, thermometer, addition funnel, and vacuum port. The synthetic fatty amine is the reaction product of ethanolamine and a $C_{14}$ to $C_{16}$ epoxide wherein the entire polyol contains 80 percent of the total weight of ethylene oxide units. 77 grams of distilled methylene diphenyl diisocyanate (MDI) is then added dropwise to the flask, producing an exotherm which is strong enough to require cooling by means of a cold water bath. Vacuum is then applied to remove the volatiles. When the exotherm subsides, another 8 grams of MDI is slowly added to the clear, light yellow liquid until the viscosity rises to the point where stirring is difficult. At that point, 1 gram of water is added to decompose unreacted isocyanate groups. The product solidifies on cooling.

EXAMPLE 2

The above experiment is repeated using 1100 grams of a polyether polyol marketed under the trademark TETRONIC ® 1504 polyol and 20.5 grams of distilled MDI. TETRONIC 1504 polyol is a polyoxyethylene adduct of polyoxypropylene condensed with ethylene diamine wherein the oxypropylene hydrophobic base has a molecular weight of about 6500 and the oxyethylene content is about 40 weight percent of the molecule. The product is a clear, light yellow, viscous liquid which solidifies on cooling.

The rate of dissolution for the products from Examples 1 and 2 is determined by placing 1 gram samples of the products in 250 ml flasks with 99 ml of water, stirring the solutions magnetically and recording the time for complete dissolution. The product of Example 1 requires 2 hours, and the product of Example 2 requires 4 hours.

EXAMPLE 3

An isocyanate cross-linked polyether polyol is prepared as in Example 1 with the exception that an isomeric mixture of 2,4- and 2,6-toluene diisocyanate is employed in lieu of the MDI.

EXAMPLE 4

An isocyanate cross-linked polyether polyol is prepared as in Example 1 with the exception that a polyoxyethylene adduct of a polyoxypropylene hydrophobic base is employed in lieu of the ethyoxylated synthetic fatty amine. The hydrophobic base of said adduct has a molecular weight of about 2050 and the oxyethylene content is about 70 weight percent of the molecule. This product is readily available on the market under the trademark PLURONIC ® F-77.

The following examples illustrate the preparation of the filaments of the instant invention and fabrics prepared therefrom.

EXAMPLE 5

An acrylonitrile copolymer solution is prepared consisting of by weight approximately 29.0 percent dimethylformamide, 66.0 percent acrylonitrile copolymer and 5 percent of the isocyanate cross-linked polyether of Example 1. The acrylonitrile copolymer used in this example is a copolymer of 93 percent acrylonitrile, 6 percent methyl acrylate and approximately 1 percent methallylsulfonate with a K-value of 81 (according to Fikentscher). This solution is spun into threads by a dry spinning process and the threads woven into cloth. The cloth exhibits a high degree of "comfort" and when soaked in water the isocyanate cross-linked polyether dissolves at a very slow rate.

EXAMPLE 6

A fabric is prepared from a filament as described in Example 5 with the exception that the isocyanate cross-linked polyether is that prepared according to Example 2.

EXAMPLE 7

A fabric is prepared from a filament as described in Example 5 with the exception that the isocyanate cross-linked polyether is that prepared according to Example 3.

EXAMPLE 8

A fabric is prepared from a filament as described in Example 5 with the exception that the isocyanate cross-linked polyether is that prepared according to Example 4.

We claim:

1. In the process of producing filaments by spinning a solution comprising a solvent and a filament forming acrylonitrile polymer, the improvement comprising adding to said solution a polymer obtained by cross-linking a polyether with an isocyanate.

2. The process of claim 1 wherein the percent of said isocyanate cross-linked polyether in said solution is about 0.5 to 10 and the percent of said solvent is about 10 to 50 all by weight of the total mixture.

3. The process of claim 2 wherein said polyether is selected from the group consisting of those which correspond to the formulae:

$$Y[(C_3H_6O)_n(C_2H_4O)_mH]_x$$

and $$Y[(C_2H_4O)_m(C_3H_6O)_n H]_x$$

wherein Y is the residue of an organic compound having from about 1 to 6 carbon atoms and containing x reactive hydrogen atoms in which x has a value of at least 1, n and m have a value such that the oxyethylene content of the molecule is from about 20 to 100 weight percent and the total molecular weight is from about 1,000 to 14,000.

4. The process of claim 3 wherein said isocyanate and polyether are reacted in an NCO:OH ratio of from about 1:10 to 10:1.

5. The process of claim 4 wherein said isocyanate is methylene diphenyl diisocyanate.

6. The process of claim 4 wherein said isocyanate is selected from the group consisting of 2,4-toluene diisocyanate, 2,6-toluene diisocyanate and mixtures thereof.

7. The process of claim 4 wherein said solvent is selected from the group consisting of dimethylformamide, dimethylacetamide, dimethylsulfoxide and N-methylpyrrollidinone.

8. The process of claim 7 wherein said solvent is dimethylformamide.

9. A process for improving the "comfort" of garments made from acrylonitrile polylmer filaments comprising incorporating in said filaments, a polymer obtained by cross-linking a polyether with an isocyanate.

10. The process of claim 9 wherein the percent of said isocyanate cross-linked polyether in said filament is about 0.5 to 10 percent of the total weight of the filament.

11. The process of claim 10 wherein said polyether is selected from the group consisting of those which correspond to the formulae $$Y[(C_3H_6O)_n(C_2H_4O)_m H]_x$$

and $$Y[C_2H_4O)_m(C_3H_6O)_n H]_x$$

wherein Y is the residue of an organic compound having from about 1 to 6 carbon atoms and containing x reactive hydrogen atoms in which x has a value of at least 1, n and m have a value such that the oxyethylene content of the molecule is from about 20 to 100 weight percent and the total molecular weight is from about 1,000 to 14,000.

12. The process of claim 11 wherein said isocyanate and polyether are reacted in an NCO:OH ratio of from about 1:10 to 10:1 .

13. The process of claim 12 wherein said isocyanate is methylene diphenyl diisocyanate.

14. The process of claim 12 wherein said isocyanate is selected from the group consisting of 2,4-toluene diisocyanate, 2,6-toluene diisocyanate and mixtures thereof.

15. A filament of acrylonitrile polymer characterized by improved "comfort" of garments made therefrom containing as an additive a polymer obtained by cross-linking a polyether with an isocyanate.

16. The filament of claim 15 wherein the percent of said isocyanate cross-linked polyether in said filament is about 0.5 to 10 percent of the total weight of the filament.

17. The filament of claim 16 wherein said polyether is selected from the group consisting of those which correspond to the formulae $$Y[(C_3H_6O)_n(C_2H_4O)_m H]_x$$

and $$Y[(C_2H_4O)_m(C_3H_6O)_n H]_x$$

wherein Y is the residue of an organic compound having from about 1 to 6 carbon atoms and containing x reactive hydrogen atoms in which x has a value of at least 1, n and m have a value such that the oxyethylene content of the molecule is from about 20 to 100 weight percent and the total molecular weight of the polyoxypropylene groups is from about 1,000 to 14,000.

18. The filament of claim 17 wherein said isocyanate and polyether are reacted in an NCO:OH ratio of from about 1:10 to 10:1.

19. The filament of claim 18 wherein said isocyanate is methylene diphenyl diisocyanate.

20. The filament of claim 18 wherein said isocyanate is selected from the group consisting of 2,4-toluene diisocyanate, 2,6-toluene diisocyanate and mixtures thereof.

* * * * *